US012738173B2

(12) United States Patent
Dahl et al.

(10) Patent No.: US 12,738,173 B2
(45) Date of Patent: Sep. 15, 2026

(54) TELEMATICS-BASED DRIVER TRAINING AND CREDENTIALING

(71) Applicant: Quanata, LLC, San Francisco, CA (US)

(72) Inventors: Eric Christopher Dahl, Newman Lake, WA (US); Scott Murray Anderson, Stanwell Park (AU); James Patrick Ryan, Roswell, GA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

(21) Appl. No.: 19/025,405

(22) Filed: Jan. 16, 2025

(65) Prior Publication Data

US 2026/0204167 A1 Jul. 16, 2026

(51) Int. Cl.
*G09B 5/02* (2006.01)
*G09B 7/06* (2006.01)

(52) U.S. Cl.
CPC . *G09B 5/02* (2013.01); *G09B 7/06* (2013.01)

(58) Field of Classification Search
CPC .................................... G09B 5/02; G09B 7/06
See application file for complete search history.

(56) References Cited

U.S. PATENT DOCUMENTS 10,223,751 B1 3/2019 Hutchinson et al.
10,830,605 B1 11/2020 Chintakindi et al.
10,878,328 B2 12/2020 Mathur et al.
11,615,478 B2 3/2023 Chintakindi
11,842,300 B1 12/2023 Gaudin et al.
12,125,106 B1 10/2024 Gallagher et al.
12,406,277 B2 9/2025 Scholl et al.
2010/0025981 A1* 2/2010 Lay ........................ B42D 15/00 283/115
2010/0238009 A1 9/2010 Cook et al.
2012/0264101 A1* 10/2012 Krohner ............. G06Q 10/1053 434/359
2013/0345927 A1 12/2013 Cook et al.
2014/0278586 A1 9/2014 Sanchez et al.
2015/0025917 A1 1/2015 Stempora
2015/0066542 A1 3/2015 Dubens
2017/0263061 A1 9/2017 Mann et al.
2017/0364821 A1 12/2017 Mathur et al.
2020/0074492 A1 3/2020 Scholl et al.
2021/0233225 A1 7/2021 Kuruvilla et al.
2022/0067839 A1 3/2022 Haugaard et al.
2023/0132673 A1* 5/2023 Russo ................... B60W 40/09 705/4
2023/0140096 A1 5/2023 Shive
(Continued)

*Primary Examiner* — Thomas J Hong
(74) *Attorney, Agent, or Firm* — BRYAN CAVE LEIGHTON PAISNER LLP

(57) ABSTRACT

A computer-implemented method for operating a computing device including: receiving telematics data from one or more sensors of an electronic device of a user; assessing driving behavior of the user based on the telematics data; generating a personalized digital training program for the user based at least on the driving behavior of the user; generating one or more driving scores for the user based on performance of the user on the personalized digital training program; and outputting a driving credential for the user based on the one or more driving scores. Other embodiments are described.

21 Claims, 6 Drawing Sheets

(56) References Cited

U.S. PATENT DOCUMENTS

| | | | |
|---|---|---|---|
| 2023/0260046 | A1 | 8/2023 | Estes et al. |
| 2023/0316418 | A1 | 10/2023 | Gross et al. |
| 2024/0062667 | A1* | 2/2024 | Kemble .................. G06F 18/22 |
| 2025/0313173 | A1 | 10/2025 | Potter et al. |
| 2026/0025373 | A1 | 1/2026 | Lowther et al. |

* cited by examiner

Network Adapter
220
Memory ROM/RAM
208
Hard Drive
114
DVD Drive
116
Universal Serial Bus
112
Disk Controller
204
Graphics Adapter
224
214
System Bus
Video Controller
202
Monitor
106
CPU
210
Keyboard Adapter
226
Keyboard
104
Mouse Adapter
206
Mouse
110
Other I/O Devices
222

TELEMATICS-BASED DRIVER TRAINING AND CREDENTIALING

FIELD OF DISCLOSURE

The present disclosure generally relates to generating telematics-based driver training and credentialing for users.

BACKGROUND

Inexperienced drivers, including newly licensed drivers, are generally involved in a disproportionate number of accidents by comparison with more experienced licensed drivers. Further, newly licensed drivers often can have higher insurance rates due to the disproportionate number of accidents experienced. Conventional approaches of driver training modules often do not use technology and can be an ineffective means of learning or improving driving skills. Additionally, the marketplace does not have robust, non-insurance telematics-based driver risk credentialing programs, thus it can be challenging to verify or differentiate lower risk drivers at any age group or level of driving experience.

BRIEF DESCRIPTIONS OF THE DRAWINGS

The figures described below depict various aspects of the systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

These are shown are shown in the drawings arrangements which are presently discussed, it being understood, however, that the present embodiments are not limited to the precise arrangements and are instrumentalities shown, wherein.

Figure 1:
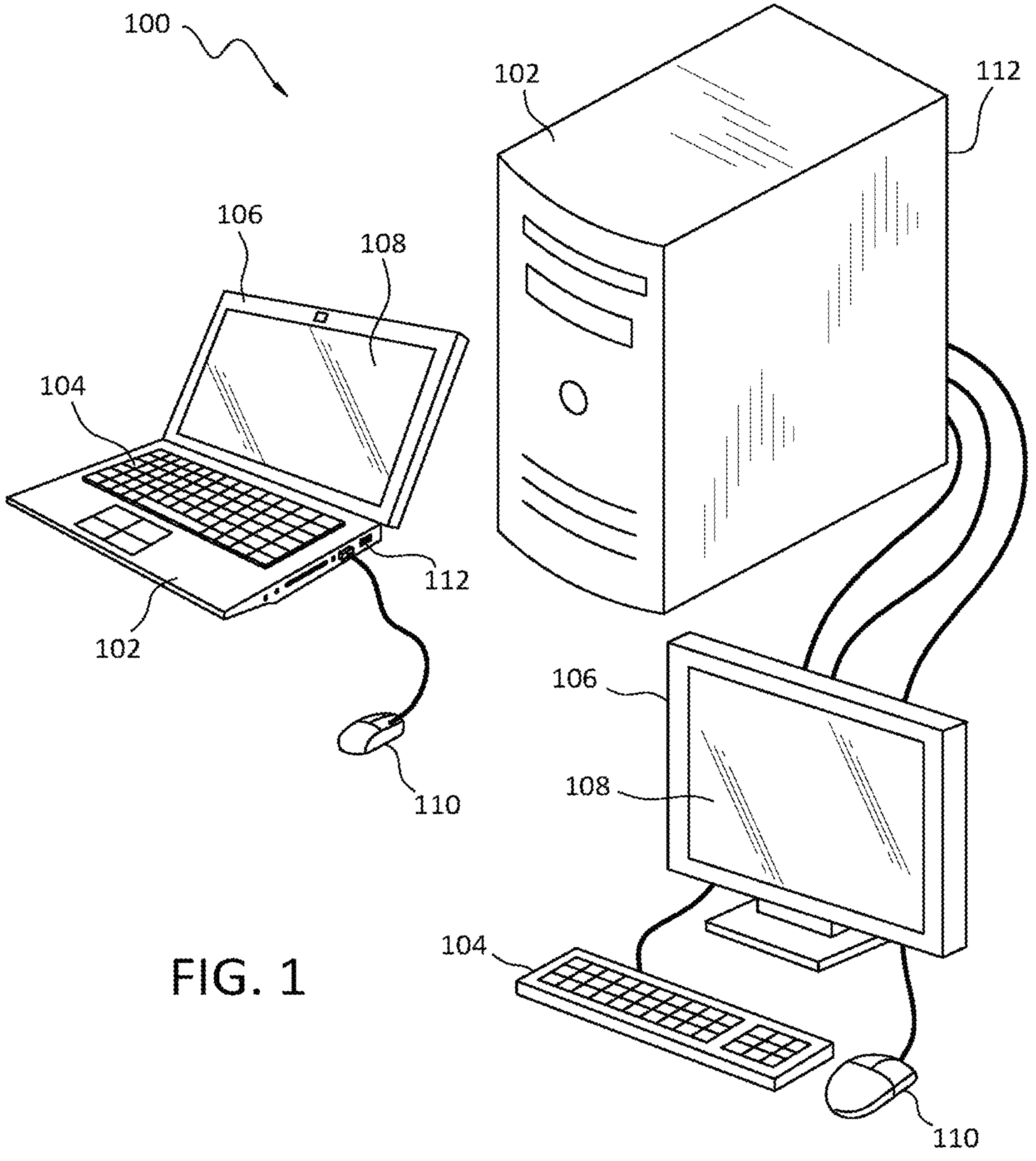
FIG. 1 illustrates a front elevation view of a computer system that is suitable for implementing an exemplary embodiment of the system disclosed in FIG. 3.

The figures depict preferred embodiments for purposes of illustration only. One skilled in the art will readily recognize from the following discussion that alternative embodiments of the systems and methods illustrated herein can be employed without departing from the principles of the technology herein.

DETAILED DESCRIPTION OF EXAMPLES OF EMBODIMENTS

The present embodiments can generally relate to providing a digital driving training program personalized to each user (e.g., driver). Driving-related digital training can be effective utilizing technology, real-time driving behavior, and/or trained machine learning (ML) and/or artificial intelligence (AI) models (the ML/AI models) personalized experiences. Such effective driver training can mean less accidents, injuries, less societal costs, and lower costs to rewarding good drivers and increasing incentives for lower risk behavior.

More specifically, various embodiments can include providing personalized digital driver training with real-time telemetry using a combination of an artificial intelligence coaching experience and using a machine learning architecture for a user. The method can include: (a) receiving telematics data from one or more sensors of an electronic device of a user; (b) assessing driving behavior of the user based on the telematics data; (c) generating a personalized digital training program for the user based at least on the driving behavior of the user; (d) generating one or more driving scores for the user based on performance of the user on the personalized digital training program; and (e) outputting a driving credential for the user based on the one or more driving scores. The method can include additional, less, or alternate functionality, including that discussed elsewhere herein.

In one aspect, a system for providing a verified risk credential (e.g., driving credential) based on a self-sovereign identity architecture for a user can be provided. The computer system can include one or more local or remote processors, servers, sensors, memory units, transceivers, mobile devices, wearables, smart watches, smart rings, smart glasses or contacts, augmented reality glasses, virtual reality headsets, mixed or extended reality headsets, voice bots, chat bots, ChatGPT bots, InstructGPT bots, Codex bots, Google Bard bots, and/or other electronic or electrical components, which can be in wired or wireless communication with one another. For instance, in one aspect, the computer system can include one or more local or remote processors and/or associated transceivers; and one or more local or remote non-transitory computer-readable media storing computing instructions that, when run on the one or more processors, direct the one or more processors to perform one or more actions or operations.

The computing instructions can direct the systems and/or processor(s) to perform: (a) receiving telematics data from one or more sensors of an electronic device of a user; (b) assessing driving behavior of the user based on the telematics data; (c) generating a personalized digital training program for the user based at least on the driving behavior of the user; (d) generating one or more driving scores for the user based on performance of the user on the personalized digital training program; and (e) outputting a driving credential for the user based on the one or more driving scores. The system can be configured to include additional, less, or alternate functionality, including that discussed elsewhere herein.

In another aspect, a computer-readable medium storing computing instructions can be provided. The computing instructions, when run on one or more processors, can cause the one or more processors to perform: (a) receiving telematics data from one or more sensors of an electronic device of a user; (b) assessing driving behavior of the user based on the telematics data; (c) generating a personalized digital training program for the user based at least on the driving behavior of the user; (d) generating one or more driving scores for the user based on performance of the user on the personalized digital training program; and (e) outputting a driving credential for the user based on the one or more driving scores. The computer readable storage medium can be configured to include additional, less, or alternate functionality, including that discussed elsewhere herein.

In another aspect, a system including one or more means to perform: (a) receiving telematics data from one or more sensors of an electronic device of a user; (b) assessing driving behavior of the user based on the telematics data; (c) generating a personalized digital training program for the user based at least on the driving behavior of the user; (d) generating one or more driving scores for the user based on performance of the user on the personalized digital training program; and (e) outputting a driving credential for the user based on the one or more driving scores.

Advantages will become more apparent to those skilled in the art from the following description of the preferred embodiments which have been shown and described by way of illustration. As will be realized, the present embodiments can be capable of other and different embodiments and their details are capable of modification in various respects. Accordingly, the drawings and descriptions are to be regarded as illustrative in nature and not as restrictive.

In several embodiments, the techniques described herein can provide a practical application and several technological improvements. The techniques describe herein can provide a technical improvement to driver training approaches by utilizing an ML/AI model digital coaching experience personalized to each driver to improve one or more driving skills. In some embodiments, the techniques described here may provide a graphical user interface configured to be displayed on a computer device or electronic device with one or more activation controls configured to activate one or more interfaces proactively.

Exemplary Computer Settings

Turning to the drawings, FIG. 1 illustrates an exemplary embodiment of two different types (e.g., a laptop and a tower server) of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part, or all of, the techniques described herein. Computer system 100 can comprise chassis 102 containing one or more circuit boards (not shown) and one or more of an input/output port 112 (e.g., one or more universal serial bus (USB) ports of one or more types (e.g., USB type-A, type-B, type-C, micro-A, micro-B, mini-A, mini-B, etc.), one or more High-Definition Multimedia interface (HDMI) ports, etc.).

Figure 2:
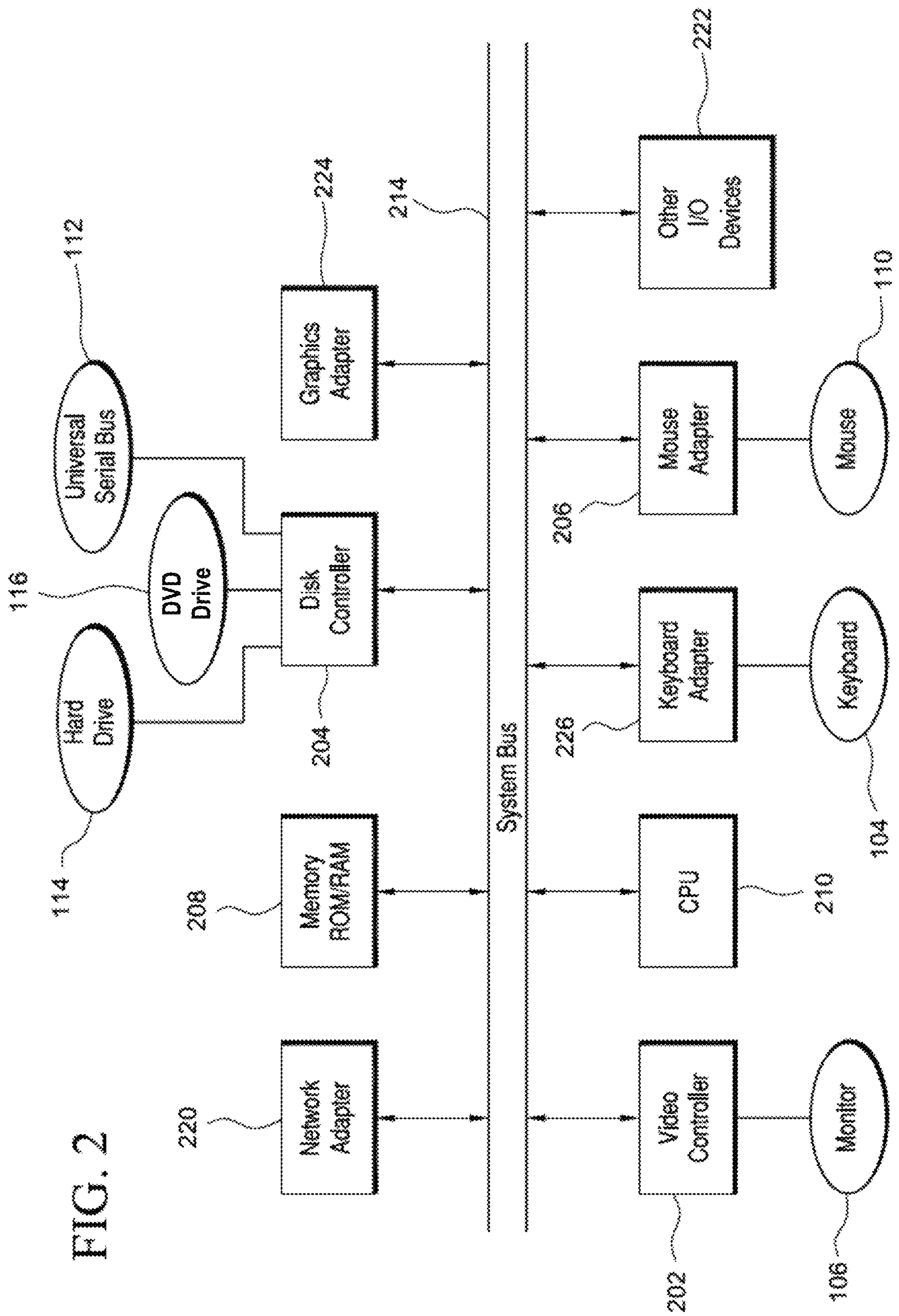
FIG. 2 illustrates a representative block diagram of an example of the elements included in the circuit boards inside a chassis of the computer system of FIG. 1.

A representative block diagram of the elements included on the circuit boards inside chassis 102 is shown in FIG. 2. A central processing unit (CPU) 210 in FIG. 2 is coupled to a system bus 214. In various embodiments, the architecture of CPU 210 can be compliant with any of a variety of commercially distributed architecture families.

Continuing with FIG. 2, system bus 214 can also be coupled to a memory storage unit 208 that includes both read only memory (ROM) and random-access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to input/output port 112 (FIGS. 1-2)), hard drive 114 (FIG. 2), and/or one or more CD-ROM, DVD, Blu-Ray, or other suitable media, such as media configured to be used in a CD-ROM and/or DVD drive 116 (FIG. 2) inside chassis 102 (FIG. 1) or in a detachable drive coupled to input/output port 112.

Non-volatile or non-transitory memory storage unit(s) refer to the portions of the memory storage unit(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS.

Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Mayada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, “processor” and/or “processing module” means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 can be coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIG. 2), input/output port 112 (FIGS. 1-2), and CD-ROM and/or DVD drive 116 (FIG. 2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), and/or implemented via one or more dedicated wireless communication chips (not shown), connected through a PCI (peripheral component interconnector) or a PCI express bus of computer system 100 (FIG. 1) or input/output port 112 (FIG. 1). In other embodiments, network adapter 220 can comprise and/or be implemented as a wired network interface controller card (not shown).

Although many other components of computer system 100 are not shown, such components and their interconnection are well known to those of ordinary skill in the art. Accordingly, further details concerning the construction and composition of computer system 100 and the circuit boards inside chassis 102 are not discussed herein.

When computer system 100 in FIG. 1 is running, program instructions stored on a USB drive in input/output port 112, on a CD-ROM or DVD in CD-ROM and/or DVD drive 116 (FIG. 2) or in the detachable CD-ROM and/or DVD drive coupled to input/output port 112, on hard drive 114 (FIG. 2), or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general-purpose computer to a special purpose computer.

For purposes of illustration, programs and other executable program components are shown herein as discrete systems, although it is understood that such programs and components can reside at various times in different storage components of computer system 100 and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a laptop computer or a tower server in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile device, such as a smartphone, smart glasses, smart watch, smart rings, wearable, virtual reality headset, augmented reality glasses, etc. In certain additional embodiments, computer system 100 can comprise an embedded system.

Figure 3:
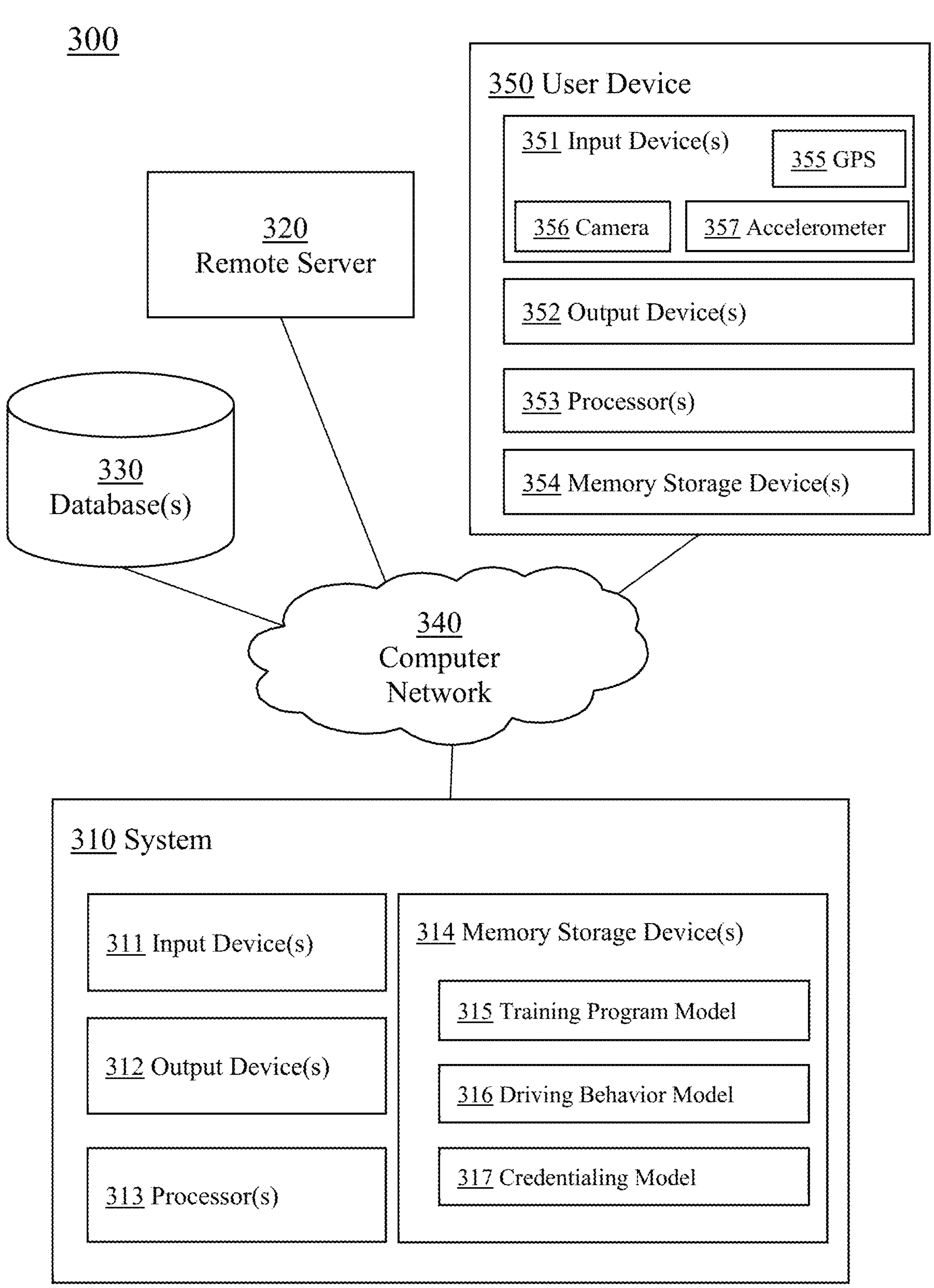
FIG. 3 illustrates a system for providing a telematics-based driving coach experience providing real-time driving feedback for a user.

Exemplary Computer Systems for Generating a Telematics-Based Driving Coach Experience Turning ahead in the drawings, FIG. 3 illustrates a block diagram of a system 300 for providing a telematics-based driving coach experience providing real-time driving feedback for a driver and generating an output of a driving credential for the driver, according to one embodiment. System 300 is exemplary, and embodiments of the system are not limited to the embodiments presented herein. The system can be employed in many different embodiments or examples not specifically depicted or described herein. In some embodiments, certain elements, modules, or systems of system 300 can perform various procedures, processes, operations, actions, and/or activities. In other embodiments, the procedures, processes, operations, actions, and/or activities can be performed by other suitable elements, modules, or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include one or more systems (e.g., a system 310), one or more remote servers (e.g., a remote server 320), and/or one or more user devices (e.g., a user device 350). System 310, remote server 320, and user device 350 can each be a computer system, such as computer system 100 (FIG. 1), as described above, and can each be a single computer, a single server, or a cluster or collection of computers or servers, or a cloud of computers or servers. In another embodiment, a single computer system can host each of system 310, remote server 320, and user device 350.

In various embodiments, system 310 can be modules of computing instructions (e.g., software modules) stored on non-transitory computer readable media that operate on one or more processors. In other embodiments, system 310 can be implemented in hardware. In many embodiments, system 310 can comprise one or more systems, subsystems, modules, models, or servers (e.g., a training program model 315, a driving behavior model 316, a credentialing model 317, etc.). Each training program model 315, driving behavior model 316, and credentialing model 317 can be implemented, at least in part, in software and/or firmware stored in or loaded on memory storage device(s) 314 and executed on processor(s) 313. Additional details regarding system 310, remote server 320, and/or user device 350 are described herein.

In some embodiments, system 310 can be in data communication, through a computer network, a telephone network, or the Internet (e.g., computer network 340), with remote server 320, and/or user device 350. In some embodiments, user device 350 can be used by users, such as users for system 310 and/or remote server 320 (e.g., a licensed driver, an unlicensed driver, an insurance policyholder, an applicant for an auto insurance policy or a professional driver's job, etc.).

In several embodiments, system 310 and/or remote server 320 can host one or more websites and/or mobile application servers. For example, system 310 and/or remote server 320 can host a website, or provide a server that interfaces with an application (e.g., a mobile application or a web browser), on user device 350, which can allow users to download driving training programs (e.g., digital training programs, driver training interfaces), a verified risk credential (e.g., a driving credential), and/or interact with (e.g., play, configure, pause, feedback etc.) the driver training interfaces (downloaded or executed on system 310 and/or remote server 320) configured to determine a performance of the driver associated with a driving skill level, generate a driving score of the driver associated with various driving skills, transmit feedback to the driver associated with driver training modules, and/or other suitable activities.

In some embodiments, user device 350 can include one or more input devices (e.g., input device(s) 351), one or more output devices (e.g., output device(s) 352), one or more processors (e.g., processor(s) 353), and/or one or more memory storage devices (e.g., memory storage device(s) 354). Examples of input device(s) 351 can include one or more keyboards, one or more keypads, one or more pointing devices such as a computer mouse or computer mice, one or more interactive touchscreen displays, a microphone, a camera, keyboard 104 (FIG. 1), mouse 110 (FIG. 1), a Global Positioning System (GPS), a camera 356, an accelerometer 357, etc. Examples of output device(s) 352 can include one or more monitors, one or more touch screen displays, projectors, monitor 106 (FIG. 1), screen 108 (FIG. 1), etc. Examples of processor(s) 353 can include CPU 210 (FIG. 2), etc. Examples of memory storage device(s) 354 can include memory storage unit 208 (FIG. 2), external storage units coupled to input/output port 112 (FIGS. 1-2), hard drive 114 (FIG. 2), CD-ROM and/or DVD drive 116 (FIG. 2), a detachable drive coupled to input/output port 112 (FIGS. 1-2), etc. In a number of embodiments, input device(s) 351 further can include one or more cameras (e.g., camera 356) and/or one or more microphones.

Input device(s) 351 and output device(s) 352 can be coupled to user device 350 in a wired manner and/or a wireless manner, and the coupling can be direct and/or indirect, as well as locally and/or remotely. As an example of an indirect manner (which can or cannot also be a remote manner), a keyboard-video-mouse (KVM) switch can be used to couple input device(s) 351 and output device(s) 352 to processor(s) 353 and/or memory storage device(s) 354. In some embodiments, the KVM switch also can be part of user device 350. In a similar manner, processor(s) 353 and/or memory storage device(s) 354 can be local and/or remote to each other.

In various embodiments, the user devices (e.g., user device 350) can be a mobile device, and/or other endpoint devices used by one or more users. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device (e.g., smart glasses, smart watches, smart rings, an augmented-reality (AR) headset, a virtual-reality (VR) headset, etc.), or another portable computer device with the capability to present audio and/or visual data (e.g., images, videos, music, etc.). Thus, in several examples, a mobile device can include a volume and/or weight sufficiently small as to permit the mobile device to be easily conveyable by hand. For examples, in some embodiments, a mobile device can occupy a volume of less than or equal to approximately 1790 cubic centimeters (cc), 2434 cc, 2876 cc, 4056 cc, and/or 5752 cc. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Mayada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Mayada, (iii) the Android™ operating system developed by the Open Handset Alliance, or (iv) the Windows Mobile™ operating system by Microsoft Corp. of Redmond, Washington, United States of America.

In various embodiments, system 310 can include: (a) one or more input devices (e.g., input device(s) 311 such as one or more keyboards, one or more keypads, one or more pointing devices such as a computer mouse or computer mice, one or more interactive touchscreen displays, a microphone, a camera, etc.), (b) one or more display or output devices (e.g., output device(s) 312 such as one or more monitors, one or more interactive touch screen displays, projectors, etc.), (c) one or more processors (e.g., processor (s) 313), and/or (d) one or more memory storage devices (e.g., memory storage device(s) 354 such as one or more internal or external memory storage units, one or more hard drives, one or more CD-ROM or DVD drives, etc.). In these or other embodiments, one or more of the input device(s) (e.g., input device(s) 311) can be similar or identical to keyboard 104 (FIG. 1) and/or a mouse 110 (FIG. 1). Further, one or more of the display device(s) (e.g., output device(s) 312) can be similar or identical to monitor 106 (FIG. 1) and/or screen 108 (FIG. 1). Additionally, one or more of the processors (e.g., processor(s) 313) can be similar or identical to CPU 210 (FIG. 2). In similar or different embodiments, one or more of the memory storage devices (e.g., memory storage device(s) 314) can be similar or identical to memory storage unit 208 (FIG. 2), external storage units coupled to input/output port 112 (FIGS. 1-2), hard drive 114 (FIG. 2), CD-ROM and/or DVD drive 116 (FIG. 2), or a detachable drive coupled to input/output port 112 (FIGS. 1-2).

The input device(s) (e.g., input device(s) 311) and the display device(s) (e.g., output device(s) 312) can be coupled to system 310 in a wired manner and/or a wireless manner, and the coupling can be direct and/or indirect, as well as locally and/or remotely. As an example of an indirect manner (which can or cannot also be a remote manner), a keyboard-video-mouse (KVM) switch can be used to couple the input device(s) (e.g., input device(s) 311) and the display device(s) (e.g., output device(s) 312) to the processor(s) (e.g., processor(s) 313) and/or the memory storage unit(s) (e.g., memory storage device(s) 314). In some embodiments, the KVM switch also can be part of system 310. In a similar manner, the processors and/or the non-transitory computer-readable media can be local and/or remote to each other.

Meanwhile, in several embodiments, system 310 also can be configured to communicate with one or more databases (e.g., a database(s) 330). The one or more databases can include a member database that contains information about the demographic, geographic, and/or psychographic information of members of a population (e.g., insurance policyholders for an insurance company, etc.). The demographic, geographic, and/or psychographic information of the members can include the ages, genders, residences, insurance policies, premiums, payment history, and/or claim histories for the members, for example, among other information.

The one or more databases additionally can include one or more of trained machine learning (ML) and/or artificial intelligence (AI) models (the ML/AI models) used in system 300 and/or system 310. The one or more databases also can include driver training databases and/or, telematics databases that contain information about the driver training interfaces (e.g., the executable programs of driver training applications or webpages, etc.). The one or more databases further can include training datasets for various ML/AI models, modules, or systems, including training program model 315, driving behavior model 316, credentialing model 317, etc. The training datasets can be obtained from a third party, generated manually, and/or curated from historical input/output data of one or more pre-trained ML/AI models, etc.

The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, system 300, system 310, and/or the one or more databases (e.g., database(s) 330) can be implemented using any suitable manner of wired and/or wireless communication. Accordingly, system 300 and/or system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc.

The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, embodiments, system 310 can be configured to transmit, to a user device (e.g., user device 350) of a user, a graphical user interface (e.g., a webpage, a graphical user interface of a mobile application, etc.) for display on the user device. The graphical user interface can include one or more activation controls (e.g., a button, a hyperlink, etc.) for activating one or more interfaces (e.g., loading an embedded driver training program on the graphical user interface, starting a personalized module (e.g., training course) on a mobile application or displaying a separate verified risk credential on a mobile application, or downloading details of test drive results upon completion of the embedded driver training program, etc.). System 310 further can determine, by any suitable approaches or ML/AI models (e.g., training program model 315, driving behavior model 316, credentialing model 317), the one or more driving course interfaces from one or more available mobile interfaces based at least in part on driver skill assessment, real-time driving feedback, driver results, demographic information, geographic information, and/or another suitable driver course interface For example, the one or more driving course interfaces can include a respective group of driving interfaces for each user age group, each driving level, and/or each portion of the course in-session and post-session. Exemplary algorithms for the ML/AI models (e.g., training program model 315, driving behavior model 316, credentialing model 317) for determining the one or more driving course interfaces can include decision trees, K Nearest Neighbor (KNN), neural networks, CatBoost, support vector machine, and/or any other suitable ML/AI model. Exemplary artificial intelligence (AI) user interfaces can include AI voice, chatbots for education, virtual assistants for recommending training modules, AI co-pilots for websites, and/or another suitable voice-activated AI technology that can interact with users. In a number of embodiments, the one or more driving course interfaces can include one or more visual prompts (e.g., icons, symbols, images, or animated images, etc.) to cause one or more user interactions with the one or more driving training programs or driver course interfaces by the user.

Still referring to FIG. 3, in several embodiments, at least one driving course interface of the one or more driving course interfaces can be configured to display at least one visual prompt of the one or more visual prompts during at least one driving course interface. For example, the at least one visual prompt can be displayed as a question of one or more questions of a quiz presented for one or more driving programs for one or more driving skills.

In various embodiments, a user interaction can be observed/determined, directly or indirectly, based on one or more inputs from input device(s) 351 of user device(s) 350. Exemplary user interactions can include clicking on a certain visual prompt within a time limit (e.g., 1 second or 2 seconds), entering an answer to a simple question (e.g., entering YES or NO as an answer, selecting the one or more visual prompts in a requested sequence (e.g., a mini-game), or dragging a certain visual prompt from location A to location B (e.g., driving course), etc.

In several embodiments, system 300, system 310, remote server 320, and/or user device 350 further can include a facial-expression-recognition model (not shown) configured to detect a user's facial expressions as an identifier, a natural language processing (NPL) model (not shown) configured to determine a user's verbal comment, and/or an eye-tracking model (not shown) implemented in any suitable hardware, software, and/or firmware. In a number of embodiments, the exemplary user interactions further can include the user's facial expressions (e.g., concentration, stressed, boredom, etc.), verbal comments, and/or eye movements (e.g., reading, etc.) determined based on one or more images taken by a camera (e.g., camera 356) or received by a microphone of user device 350.

In various embodiments, the at least one interactive interface of a driver training mode, a driver mode, a driving credential mode, or a reward mode further can be configured to detect driving performance (e.g., a response or reaction time, and/or verbal comments, etc.), by the user, associated with the at least one visual prompt. In the same or different embodiments, the graphical user interface can comprise the at least one driving interface, or the graphical user interface can be separate from the at least one interactive interface. When the graphical user interface is separate from the at least one driving interface, the at least one driving interface can be displayed on an electronic device that is different from the user device that displays the graphical user interface.

In several embodiments, system 310 also can determine whether at least one of the one or more interactive interfaces is activated. At least one of the one or more interactive interfaces can be determined to be activated after system 310 (*a*) receives, from the user device, an activation command associated with the one or more activation controls; and (b) upon determining, based on the activation command, that at least an activated activation control of the one or more activation controls is activated, causes an activated interface of the one or more driver training programs (e.g., training program model 315, driving behavior model 316, and/or credentialing model 317) to be activated. System 310 can cause the activated interactive interfaces to be activated by any suitable approaches, including: (a) transmitting, to the user device, an activated interactive interface of the one or more driver training programs for display on the user device; or (b) causing the user device to load the activated interactive interface of the one or more driver training programs from (i) a non-transitory computer readable storage medium (e.g., a USB drive in USB port 112 (FIGS. 1-2), a CD-ROM or DVD in CD-ROM and/or DVD drive 116 (FIG. 2) or in a detachable drive coupled to input/output port 112 (FIGS. 1-2), hard drive 114 (FIG. 2)) of the user device (e.g., user device 350), or (ii) a remote server (e.g., remote server 320) for display on the user interface. In various embodiments, the activated interactive interface can be displayed in (a) the graphical user interface of the user device, (b) at least one interactive interface of the one or more driver training programs of the graphical user interface of the user device, (c) at least one interactive interface of the one or more driver training programs that is separate from the graphical user interface but that is still of the user device, or (d) at least one interactive interface of the one or more driver training programs that is separate from the graphical user interface and that is of an electronic device that is different from the user device.

In a number of embodiments, upon determining that an interactive interface of the one or more driver training programs is activated, system 310 additionally can: (a) receive, in real-time from the user device (e.g., user device 350), the one or more user interactions with the visual prompt(s) of the interactive interface; and/or (b) receive, from the user device, driving performance data associated with the one or more user interactions. Examples of the driving performance data can include a reaction or response time, a focus time span, a distracted time span, etc.

In several embodiments, system 310 further can determine, by the one or more processors and/or an ML/AI model (e.g., training program model 315, driving behavior model 316, or credentialing model 317), one or more cognitive factors and/or motor facilities for the user based on the driving performance data and/or the driving score. The one or more cognitive factors and/or motor facilities can be predetermined (e.g., by medical researchers) to be related to or associated with a person's abilities to perform certain task(s) (e.g., driving performance of a vehicle) and/or health or physical conditions (e.g., sleep deprivation, under the influence of medication). In certain embodiments, one or more of the one or more cognitive factors and/or motor facilities can include one or more pass rates or an average pass rate of one or more driving skills displayed on one or more interactive interfaces engaged by the user. In a few embodiments, one or more of the one or more cognitive factors also can include responsive emotions detected while the user is interacting with the one or more driver training programs (e.g., digital training courses). For example, when a user looked confused, frustrated, concentrating, stressed, or bored while answering a question correctly, a cognitive factor of the cognitive factors can include these emotions, along with or instead of an indication that the user made a correct guess. In some embodiments, users with better performance at the games related to visuospatial memory, processing speed, and/or attention can be more likely to engage in unsafe driving behaviors such a distracted driving because such users may be more comfortable with multi-tasking, and the one or more cognitive factors further can include visuospatial memory, processing speed, and/or attention. In the same or different embodiments, users detected to have emotions such as confusion, frustration, and/or stress can be less likely to engage in unsafe driving behaviors, while users detected to have emotions such as concentration or boredom can be more likely to engage in unsafe driving behaviors. Similarly, users detected to have a higher pass rate, a faster pass rate, a higher frequency of play, etc. can be more likely to engage in unsafe driving behaviors. Examples of the ML/AI model for determining the one or more cognitive factors based on the driving performance data can include a neural network model, an XGBoost model, and/or any other suitable ML/AI model.

In some embodiments, system 310 further can generate, by the one or more processors and/or an ML/AI model (e.g., training program model 315, driving behavior model 316, credentialing model 317), an output associated with the user based at least in part on the one or more cognitive factors and/or motor facilities, as determined. Examples of the output can include a discount value for an insurance policy of the user offered by an insurance company, a likelihood of safe driving, a recommendation to engage in further digital training courses, a recommendation to retake one or more digital training courses, etc. In embodiments that use a pass rate or an average pass rate as one of the one or more cognitive factors and/or motor facilities, the output can be determined based at least in part on one or more of: (a) the pass rate or the average pass rate (e.g., a likelihood of safe driving being proportional to the average pass rate, etc.), (b) whether the average pass rate reaches or exceeds a predetermined threshold (e.g., 70%, 80%, 85%, and/or any other suitable predetermined threshold, etc.), or within a predetermined range (e.g., 30-80%, 50-75%, and/or any other suitable predetermined range, etc.), and/or (c) a ranking of the user's performance in the age group of user, etc.

Figure 4:
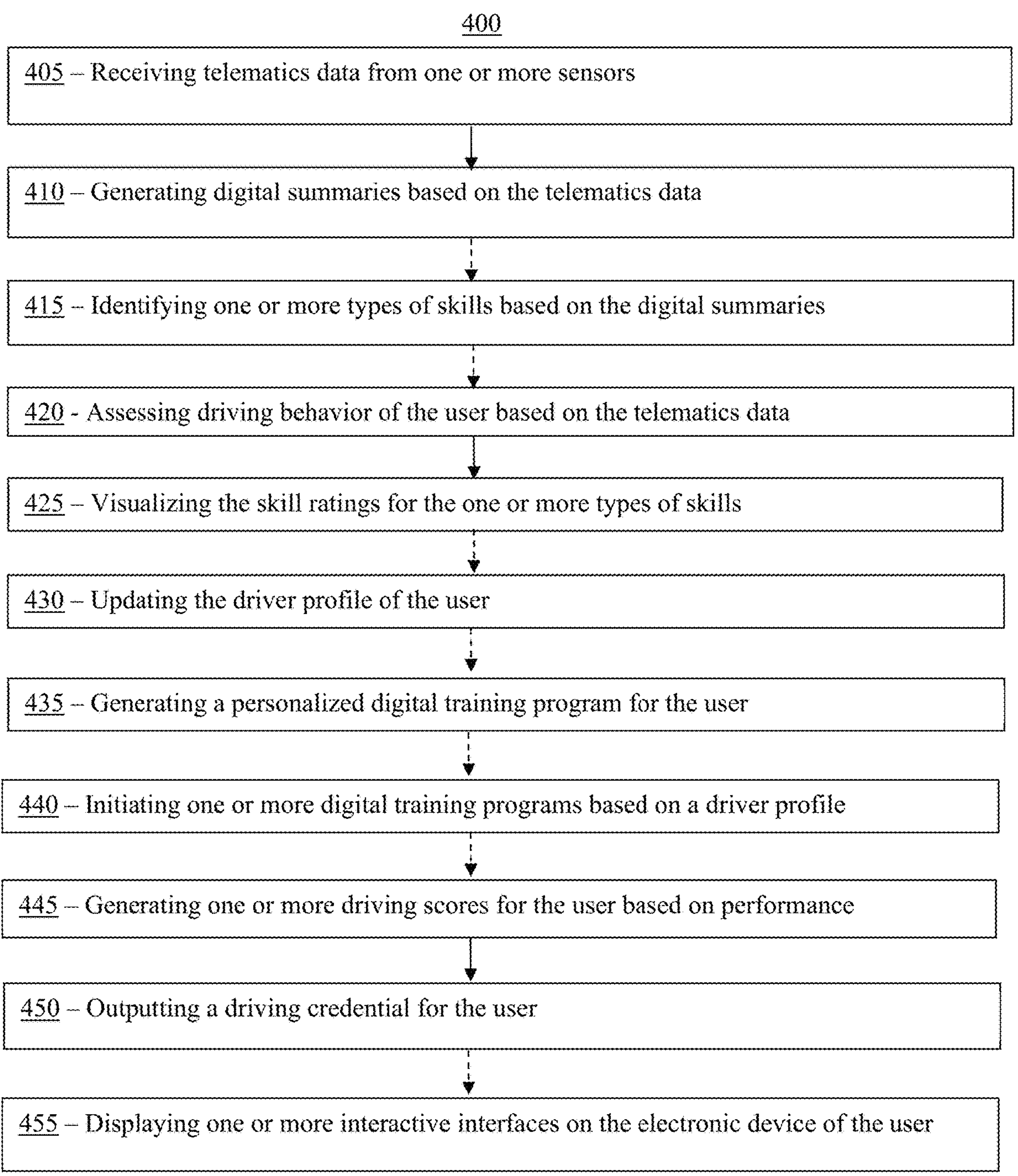
FIG. 4 illustrates a flow chart for a method for providing a personalized digital driver training with real-time telemetry utilizing a combination of artificial intelligence and a machine learning architecture for a user.

Exemplary Embodiments for Providing Telematics-Based Driver Training and Credentialing Turning ahead in the drawings, FIG. 4 illustrates a flow chart for a method 400 for providing a personalized digital driver training with real-time telemetry utilizing a combination of artificial intelligence and a machine learning architecture for a user, according to an embodiment. Method 400 can be implemented via execution of computing instructions configured to run on one or more processors and stored on one or more non-transitory computer-readable media. Method 400 is exemplary and is not limited to the embodiments presented herein. Method 400 can be employed in many different embodiments or examples not specifically depicted or described herein.

In various embodiments, the procedures, the processes, the operations, the actions, and/or the activities of method 400 can be performed in the order presented. In other embodiments, the procedures, the processes, the operations, the actions, and/or the activities of method 400 can be performed in any suitable order. In still other embodiments, one or more of the procedures, the processes, the operations, the actions, and/or the activities of method 400 can be combined or skipped.

In several embodiments, system 300 or system 310 (FIG. 3) (including one or more of its elements, modules, and/or systems, such as training program model 315, driving behavior model 316, and/or credentialing model 317 (FIG. 3)) can be suitable to perform method 400 and/or one or more of the operations, actions, and/or activities of method 400. In these or other embodiments, one or more of the operations, actions, and/or activities of method 400 can be implemented as one or more computing instructions configured to run on one or more processors and configured to be stored on one or more non-transitory computer readable media. Such non-transitory computer readable media can be part of a computer system such as system 300 or system 310. The processor(s) can be similar or identical to the processor(s) described above with respect to computer system 100 (FIG. 1).

Referring to the drawings, FIG. 4 can include an activity 405 of receiving telematics data from one or more sensors of an electronic device of a user. The electronic device can be similar or identical to user device 350 (FIG. 3). The sensors can include GPS 355 (FIG. 3), camera 356 (FIG. 3), accelerometer 357 (FIG. 3), etc. Activity 405 also can include receiving telematics data from one or more transceivers or sensor devices located in a mobile application, an onboard computer, a mounted sensor and/or transceiver on the exterior of the vehicle, a smart infrastructure, and/or another suitable communication device or structure. In some embodiments, collecting telematics data, using one or more sensors or one or more transceivers, can include continuously monitoring a performance of a vehicle being operated by a driver during a time period, in which the sensors or transceivers are automatically initiated or turned on concurrently in response to the trigger event of (i) starting the ignition of the vehicle or (ii) after a predetermined time once the vehicle is detected to be in motion. In several embodiments, collecting telematics data, using one or more sensors or one or more transceivers, also can include other triggering events that turn on the sensors or transceivers after an event has been detected to have occurred. In various embodiments, the sensors or transceivers remain off while the vehicle is initiated and/or moving in a direction on a path over the time period until one of the other triggering events turns the sensors or transceivers on. In several embodiments, the triggering event automatically causes the sensors or transceivers to turn on and begin recording or monitoring the performance of vehicle over the time period or a duration of the trip with multiple stops marked over the route along the way.

In various embodiments, triggering events can include a predetermined event or a set of conditions, a weather condition, a road surface, a type of terrain, traffic patterns, a predetermined route labeled as a work trip, a predetermined route labeled as a personal trip, identifying a respective driver out of multiple drivers, after passing a breathalyzer test hardwired to the vehicle, after a biometric identification marker has been verified by the a mobile application, and/or another suitable triggering event. In many embodiments, digital or wireless commands to perform various activities can be encoded into one or more sensors, transceivers, mobile applications, microchips of onboard systems of a vehicle, and/or a smart infrastructure. In several embodiments, such command codes to perform one or more of these activities can include at least detecting movements, monitoring driving conditions, recording a trip, transmitting data to other devices and/or applications in real time, collecting digital or wireless signals of data for input in a ML/AI model analyzing the telematics data, and/or another type of ignition related activity upon receiving respective command codes to perform these activities.

In various embodiments, FIG. 4 also can include optionally or alternatively an activity 410 of generating digital summaries based on the telematics data over a predetermined time period. In some embodiments, generating digital summaries can include filtering the telematics data by various activities or groups, such as driving behavior, a work trip, and/or a personal trip. In various embodiments, the telematics data can be recorded and/or monitored in real-time.

In several embodiments, FIG. 4 further can include optionally or alternatively an activity 415 of identifying one or more types of skills based on the digital summaries corresponding to the driving behavior of the user. In some embodiments, the one or more driving behaviors can include referencing the physical actions and cognitive decisions made while operating a vehicle are part of a driving skill. Such driving behaviors can include driving smoothness, driving focus, awareness of the road, obeying the rules of the road, driving maneuvers, impaired driving, aggressive driving, tailgating, distracted driving, and/or another suitable driving behavior in the telematics data.

In some embodiments, the driving behaviors also can be given a weight based on events or factors that can influence or effect a driver's ability or performance such as age, gender, visibility, weather, traffic, a mental condition, a physical condition, and/or another type of event. In some embodiments, safe-driving skills can include knowledge of traffic laws, staying up-to-date on new traffic laws, anticipating other driver behavior, avoiding vehicle blind spots, managing speed, enter/exit ramps, following distances, an understanding of the driver right of way, avoiding distractions, taking digital training programs at different levels of driving experience, and/or another suitable safe-driving skill. In several embodiments, safe-driving skills can be included as subject matter tested via quizzes as part of a respective training course or module.

In various embodiments, the one or more types of skills, as identified, can include basic driving skills and advanced driving skills. In some embodiments, the basic driving skills (e.g., safe-driving skills) can include maneuvering space, negotiating intersections, managing vehicle speed, negotiating curves at various speeds, turning, merging, passing, negotiating highway on-ramps, interchanges, and off-ramps, and/or another safe driving basic skill. In several embodiments, advanced driving skills (e.g., defensive driving skills) can include maneuvers on the road using care and attention while driving. In various embodiments, advanced driving skills can include being aware of a vehicle position relative to other vehicles at all times (e.g., changing lanes), maneuvering cross roads, turning left and right being aware of blind spots, safe passing and overtaking a vehicle on the road by estimating speed and distance of oncoming traffic, avoiding rollovers while navigating curves in the road or inclement weather road conditions, braking safely to a top to avoid an accident, and/or another defensive driving skill. In several embodiments, defensive-driving skills can be included as subject matter tested via quizzes as part of a respective training course or module.

In some embodiment, FIG. 4 additionally can include an activity 420 of assessing driving behavior of the user based on the telematics data. In several embodiments, assessing driving behavior, using a mobile application, can include using a combination of behavior science and a driving algorithm of an ML/AI model (e.g., driving behavior model 316 (FIG. 3)), modules, or systems. In several embodiments, assessing driving behavior can include using behavioral science to study human behavior as it relates to how a user makes decisions while driving. In some embodiments, understanding how a user makes decisions while driving can lead to generating one or more driving scores associated with one or more driving skills.

In various embodiments, assessing driving behavior can begin with a user taking a real-world driving test that is designed to test a number of driving skills over a predetermined route or path. In some embodiments, driving skills can include performance driving maneuvers or operations such as accelerate, brake, coast, lane switch, left turn, right turn, roundabout, phone handling, and/or another suitable driving operation. In several embodiments, assessing driving behavior can include collecting and processing telematics data for the time period covering the route. In many embodiments, assessing driving skills can include detecting a number of times and a driving skill was used to perform each of the driving skills of the telematics data.

In some embodiments, assessing driving behavior can also include transmitting feedback, in real-time, to the user in various formats (e.g., visual or voice). In several embodiments, feedback can include an interactive AI voice command, a visual review of results from a completed course on a user interface, a recommendation on whether to retake a module or continue to another module, a bar graph depicting trip detections and anomalies during a driving test and/or another suitable feedback method.

In various embodiments, processing the telematics data to determine a level of respective driving skills can begin with filtering each of the one or more types of driving skills that meet or exceed a threshold level of safe-driving maneuvers performed over a time period.

In some embodiments, the driving route or driving path can be custom designed to cover a standardized group of driving skills based on a geographic location corresponding to where the user frequently commutes and/or resides. As an example, the geographic location can be a route to work, a neighborhood, or nearby a city. In some embodiments, in order to geographically cover the standardized group of driving skills, a radius around the distance of the custom path outlined on a digital map can be drawn around a vicinity to include all of the driving skills for the assessment. In some embodiments, the driving test route can be transmitted as an interactive drive test displayed on an electronic device of the user or a mini-game.

In many embodiments, activity 420 further can include rating each of the one or more types of skills using a respective skill level assessment to generate a skill rating for each of the one or more types of skills. In various embodiments, generating the respective skill level assessment can include outputting a percentage of performance rated against other driving performances for that skill of the other driver. In some embodiments, a rating further can be fine-tuned by accounting for one or more driving conditions during the drive test. Such driving conditions that can affect a rating can include seasonal weather conditions, road construction, vehicle accidents of other vehicle unexpectedly occurring during a drive test trip, animal crossings, and/or another suitable type of driving condition. In several embodiments, activity 420 also can include determining an overall level of skill based on the overall skill ratings for the user. In some embodiments, activity 420 also can include storing the overall level of skill on a driver profile of the user.

In several embodiments, the user utilizes a self-sovereign identity (SSI) platform to create a fraud-proof verifiable credential that verifies the authenticity of the verified driving credential. In some embodiments, the user owns and controls whether or not to share any portions of the digital data as stored and/or updated in the driver profile of the user. In many embodiments, the self-sovereign platform can extend beyond identity to allow the driver to control data associated with the user (e.g., telematics data, driver training performance data, credential data, etc.), such as who can obtain access to such data and how the data can be used by those who obtain access.

In various embodiments, FIG. 4 also can include an activity 425 of visualizing the skill ratings for one or more types of skills as concentric circles displayed on a graphical user interface (GUI) of a mobile device of the user. In many embodiments, a center of the concentric circles can indicate a baseline level associated with a good driving standard. In some embodiments, the baseline level can include a range of respective skill levels that meet or exceed the good driving standard. In many embodiments, each outer circle can indicate another level associated with another driving standard.

In several embodiments, FIG. 4 further can optionally or alternatively include an activity 430 of updating the driver profile of the user when a new respective skill level assessment is completed. In many embodiments, activity 430 can include capturing each new skill level assessments completed of one or more skills of each driver profile over a lifetime of the user. For example, a newly licensed driver can complete digital driving training modules and/or a test drive portion of the driving training module during the first year as a newly licensed driver. As the newly licensed driver gains more driving experience and takes other digital driving training modules and/or the test drive portion, the data can be updated and saved each time accordingly.

In many embodiments, FIG. 4 additionally can include an activity 435 of generating a personalized digital training program for the user based at least on the driving behavior of the user. In some embodiments, generating the personalized digital training program can include using one or more processors and/or the ML/AI models (e.g., training program model 315 (FIG. 3)). In some embodiments, generating the personalized digital training program also can include customizing test content of one or more courses based on evaluating the strengths and weaknesses identified during drive tests of each respective driver. In various embodiments, the ML/AI model can identify the type of driving skills to include as part of the personalized digital training courses based on at least the driving scores. In many embodiments, activity 435 also can include identifying one or more types of digital training courses corresponding to one or more skill ratings that fall below or equal a predetermined threshold for safe driving standards. In some embodiments, the one or more types of digital training courses can include at least one of: monitoring vehicle trips, interacting with driving simulations, and/or responding to online quizzes. In various embodiments, the content for the online quizzes can include questions from laws of the road for a state government entity, state statutes, personality character traits, and/or another suitable testing source. In several embodiments, the ML/AI models can provide feedback in real-time to the user during and after completing each of the digital training programs that make up the personalized digital training program for each respective user.

In a number of embodiments, FIG. 4 also can optionally or alternatively include an activity 440 of initiating one or more digital training programs based on a driver profile of the user for display on a graphical user interface of the electronic device of the user. In some embodiments, the digital training program initialized can one that was generated in activity 435.

In various embodiments, FIG. 4 further can include an activity 445 of generating one or more driving scores for the user based on performance of the user on the personalized digital training program. In many embodiments, activity 445 also can include rating training performance results for the user using the personalized digital training program. In some embodiments, activity 445 further can include displaying the training performance results on a graphical user interface (GUI) of a mobile device of the user.

In some embodiments, FIG. 4 additionally can include an activity 450 of outputting a driving credential for the user based on the one or more driving scores. In many embodiments, activity 450 also can include securing data of the one or more driving scores corresponding the driving credential in a secure database for the user. In several embodiments, prior to accessing the secure database, activity 450 further can include verifying an identify of the user using a verified digital credential. In some embodiments, verifying an identity of the use can include using one or more facial-expression-recognition models, one or more eye-tracking models, one or more retina scan models, one or more fingerprint models, and/or another suitable biometric model. In various embodiments, activity 450 additionally can include authorizing access or transmission of the one or more driving scores to a third party as authorized by the user.

In various embodiments, the user is a self-sovereign owner that owns the data as used in outputting the driving credential for the user. In some embodiments, the user decides, using the mobile application, whether or not to transmit the verified digital credential to a third party.

In several embodiments, FIG. 4 also can optionally or alternatively include an activity 455 of displaying one or more interactive interfaces on the electronic device of the user. In many embodiments, the one or more interactive interfaces comprise one or more of a driver training mode, a drive mode, a driving credentials mode, or a rewards mode.

In some embodiments, displaying an interactive interface of the drive mode can include tracking the vehicle while being operated driving over the route or path as part of the driving test. In various embodiments, displaying an interactive interface of the drive mode can include an icon or avatar moving concurrently along a simulated map of the route, highlighting trip detections and/or anomalies of the driving behavior in real-time, highlighting check points along the route for various skill levels encountered, highlighting alerts for driving conditions or traffic hazards, and/or another suitable type of monitoring activity. In many embodiments, highlighting trip detections and/or anomalies can include highlighting a trip detection in a particular pre-defined color and trip anomalies in another pre-defined color upon detection. In some embodiments, highlighting check points or other notable markers on the trip or driving test can include different colored icons representing different driving skills. In various embodiments, trip detections can include detecting a driving metric associated with one or more driving skills being assessed during the driving test, a simulated driving event, a mini-game, and/or another suitable driving metric. In several embodiments detecting anomalies can include driving operations that fall outside of the driving skill level that can be alerted by different color levels, a haptic vibration, an alert sound, or a voice command to alert the user in real-time. Such anomalies can include speeding, hard cornering, hard braking, sudden maneuvers associated with distracted driving or unfocused driving, behavior signs associated with drowsiness or falling asleep, and/or another suitable type of driving alert.

In various embodiments, various skill levels that can be identified for a custom driver training course can include speeding, hard cornering, hard braking, distracted driving, unfocused driving, a quantity of driving without a break or a stop, and/or another suitable skill level for training.

In several embodiments, displaying the driving credentials mode can include an interactive permission or authorization mode that prevents inadvertent transmission or display of the verified digital credential to a third party as part of one or more secure digital measures embedded into the mobile application. In many embodiments, the user can grant permission or authorization remotely to a third party via a wireless server or signal transmission. In some embodiments, the verified digital credential can be based on multiple factors of risk and parameters within the factors that make up a good driver. In several embodiments, the verified digital credential can take a form of an image displayed on a user interface of a webpage or transmitted to a third-party to verify (i) the identity of the user, and (ii) that the driver possesses driving skills above a threshold of safe driving standards. In some embodiments, the verified digital credential can be used as a universal emblem or image indicating the user is a safe driver.

In various embodiments, displaying an interactive interface of the rewards mode can include awarding a discount for an insurance rate, earning a lower interest rate on a purchase such as a car or a house, a discount for a rental car, an employment credential, a membership, or another suitable reward for a safe driving credential. In many embodiments, the rewards can incentivize behavioral change for the driver, which can result in improved driving behaviors, accelerated completion of the training program, etc.

Exemplary Content Displayed on a Display Device

Figure 5:
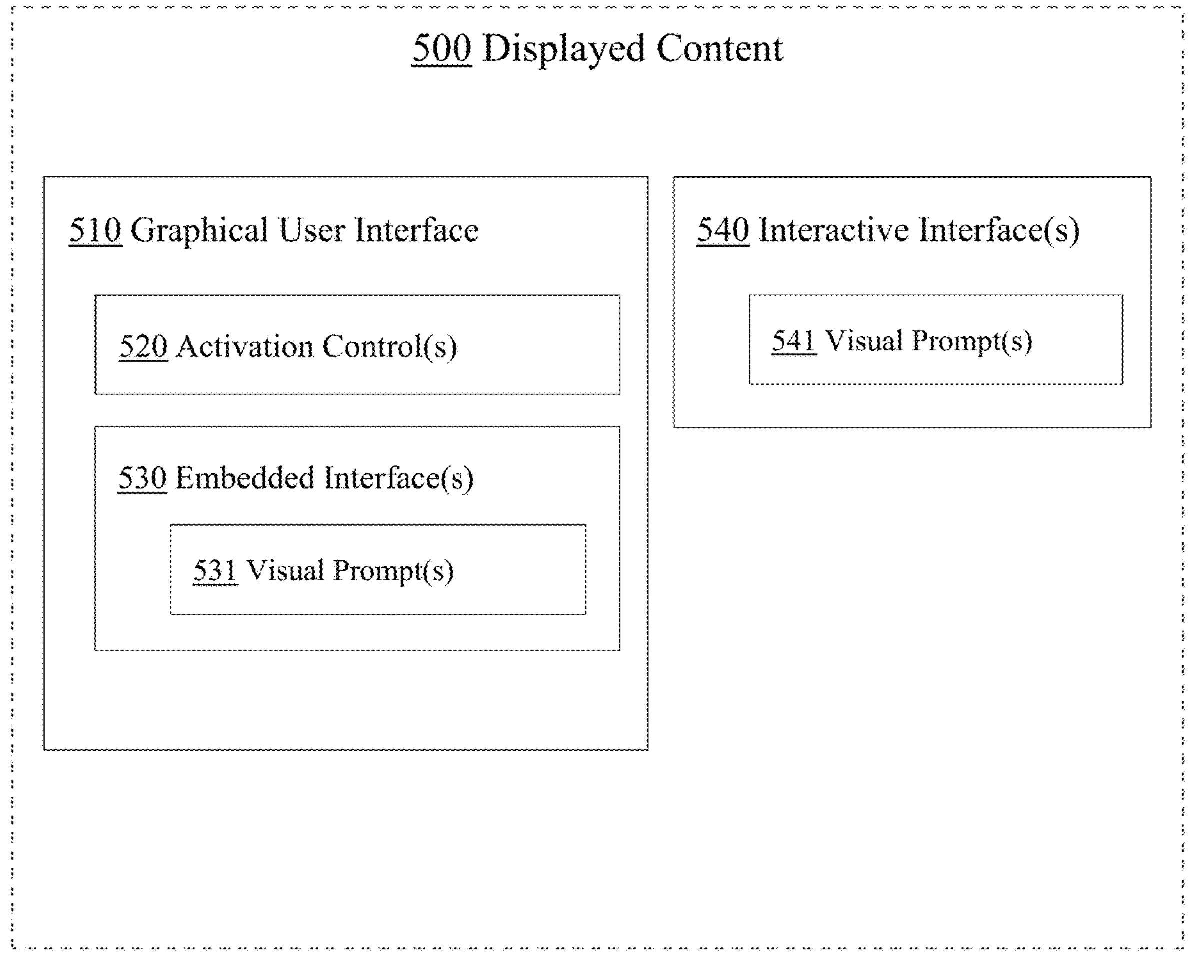
FIG. 5 illustrates examples of displayed content of a display device on a user interface for determining a skill level assessment of a user.

Turning ahead in the drawings, FIG. 5 illustrates an example of displayed content 500 displayed on a display device (e.g., monitor 106 and/or screen 108 (FIG. 1)), according to an embodiment. Displayed content 500 is merely exemplary and is not limited to the embodiments presented herein. In a number of embodiments, displayed content 500 can include a graphical user interface 510 and one or more interactive interface(s) 540. Graphical user interface 510 can include one or more activation control(s) 520 and/or one or more embedded interface(s) 530 with one or more visual prompt(s) 531. Interactive interface(s) 540 can include one or more visual prompt(s) 541. In some embodiments, the user interfaces and/or portions thereof of displayed content 500 can be arranged in the layout presented. In other embodiments, the user interfaces and/or portions thereof of displayed content 500 can be arranged in any suitable layouts. In still other embodiments, one or more of the user interfaces and/or the portions of displayed content 500 can be combined or omitted. In many embodiments, system 300 (FIG. 3), system 310 (FIG. 3), or method 400 (FIG. 4) can be suitable to generate, transmit, and/or display or cause to display graphical user interface 510, embedded interface(s) 530, visual prompt(s) 531, interactive interface(s) 540, visual prompt(s) 541, and/or any portions thereof.

Referring to FIG. 5, in a number of embodiments, graphical user interface 510 can be similar or identical to the graphical user interface discussed above (see, e.g., activity 455 (FIG. 4)). Embedded interface(s) 530 and/or interactive interface(s) 540 can be similar or identical to the one or more interfaces discussed above (see, e.g., activity 425, 445, 450, or 455 (FIG. 4)). Visual prompt(s) 531 and/or visual prompt(s) 541 can be similar or identical to the one or more visual prompts discussed above (e.g., 425, 445, 455 (FIG. 4)) or shown in FIG. 6. In several embodiments, embedded interface(s) can include activation control(s) 520. In similar or different embodiments, there can be no embedded interface(s) 530 or interactive interface(s) 540.

Figure 6:
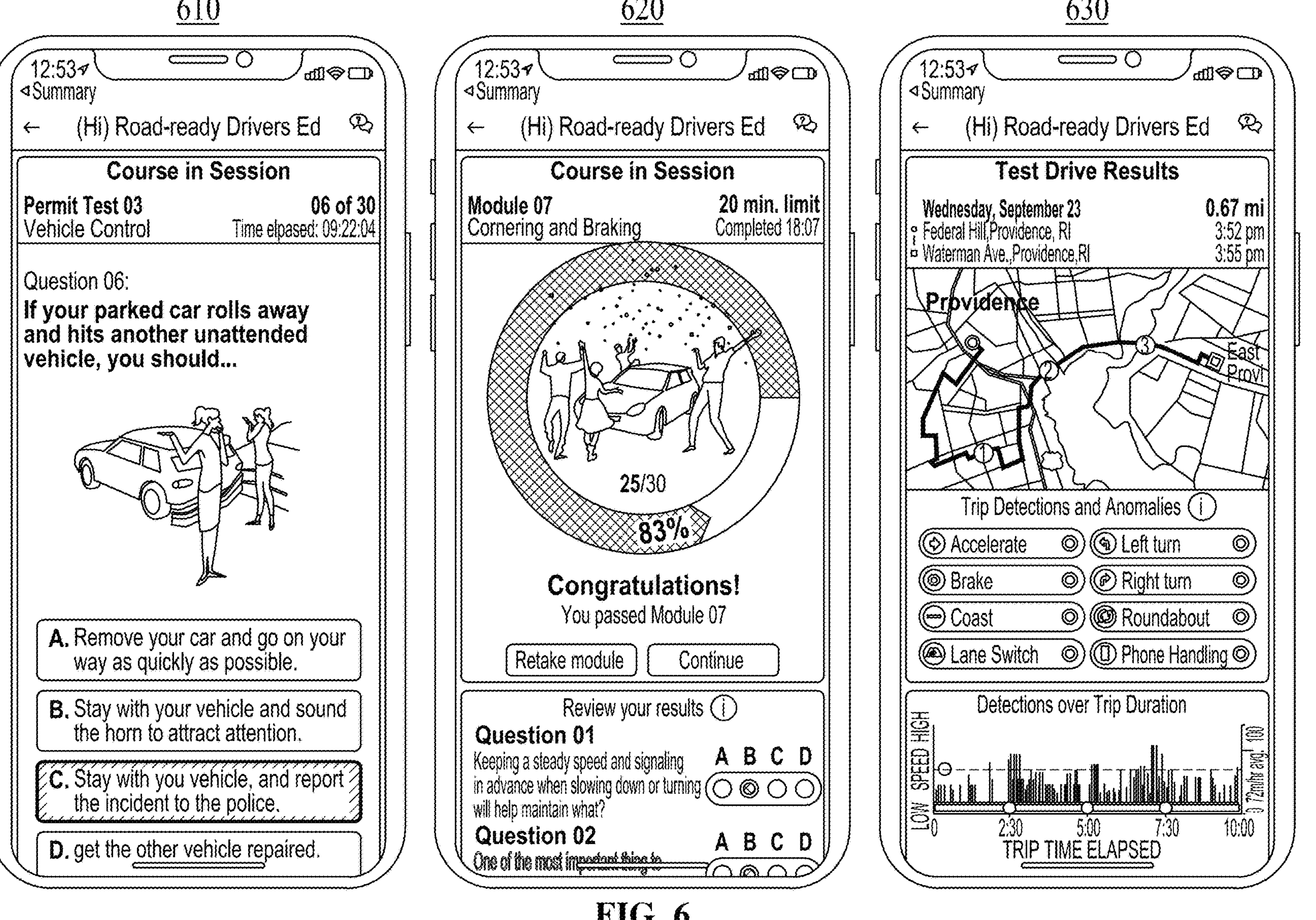
FIG. 6 illustrates exemplary user interface displays for displaying context of the digital driver training.

Turning ahead in the drawings, FIG. 6 illustrates examples of user interface displays 610, 620, and 630 on a mobile device of a user, according to another embodiment. User interfaces displays 610, 620, and 630 show various stages of engagement associated with the driving training courses. As an example, user interface display 610 illustrates an in-session driver training course in which a user can be actively engaging with a training course mid-way thorough a question and answer segment of the module. In some embodiments, the interactions can utilize visual or audio elements, such audio elements can include using a voice interface or an AI chatbot. In many embodiments, user interface display 620 shows module results after a user completes a driver training course illustrating that (i) the user passed the driving module with a score of 83%, (ii) the user can scroll down the webpage and review the results of the question and answer segment of the module for visual feedback, (iii) the user can interact with a voice activated avatar or an AI chatbot for feedback on the driver training course, and (iv) the user can select either a request to retake the module or continue with the course in-session. As another example, user interface display 630 shows results of an actual driving test using a vehicle driven by the user. In this example, telematics data collected over the path of the driving test can be analyzed and displayed as test drive results. Such test drive results can include a distance covered, a start/end time, a map visually outlining the path of the test drive, and trip detections and anomalies that can be viewed in two formats: (i) a table of icons and driving skills detected over the distance of the trip and (ii) a bar graph showing a frequency and severity of the driving skills performed by the user as detected over the time period. In various embodiments, a voice-activated avatar or an AI chatbot can respond to questions during the driving test and after the driving test is completed. In some embodiments, a voice-activated avatar or an AI chatbot can audibly identify trip detections and trip anomalies during the driving test and/or after the driving test is completed.

Exemplary Machine Learning Models

In several embodiments, the systems and/or methods can use one or more ML/AI models (e.g., training program model 315, driving behavior model 316, and/or credentialing model 317 (FIG. 3)) to perform one or more of the above-mentioned procedures, processes, activities, actions, operations, and/or methods. Further, the systems and/or methods can use, and the one or more ML/AI models can include, one or more facial-expression-recognition models, one or more eye-tracking models for authorizing access or transmission of the user's data, or one or more NLP models for processing the one or more inputs and/or outputs from the one or more activation controls and/or the one or more user interactions. Examples of the algorithms used for the various ML/AI models can include BERT, LLM, Lambda, Palm, XLNet, GPT-3, GPT-4, KNN, decision trees, linear regression, logistic regression, K-Means, neural networks, fuzzy logic, GANs, CTGAN, CNNs, VAEs, and so forth. In various embodiments, each of the ML/AI models used can be trained dynamically and/or regularly.

In various embodiments, the systems and/or methods can be configured to train or re-train the one or more ML/AI models. The training of each of the ML/AI models can be supervised, semi-supervised, and/or unsupervised-which in some embodiments can be followed by, or used in conjunction with, other techniques, such as re-enforcement machine learning techniques, or other techniques utilized by ChatGPT-based voice bots or virtual assistants. The training data of training datasets for pre-training or re-training each of the ML/AI models can be collected from various data sources, including historical input and/or output data by the ML/AI model. The collection and update of the training data in the training datasets can be performed once, periodically (e.g., every day, every week, etc.), or constantly. For example, in certain embodiments, the input and/or output data of an ML/AI model can be curated by a user (e.g., an ML engineer, a data scientist, etc.) or automatically collected every time the ML/AI model generates new output data to update the training datasets for re-training the ML/AI model. In many embodiments, the trained and/or re-trained ML/AI model as well as the training datasets can be stored in, updated, and accessed from a database (e.g., database(s) 330 (FIG. 3)). In the same or different embodiments, when more than one training dataset is used for the pre-training and/or re-training, the data of the more than one training dataset can be formatted or reformatted so that the hierarchy, schema, and/or other aspects of the data of the more than one training dataset (especially when datasets are from different sources)

follow a common hierarchy, structure, schema, etc., and so that the data of the more than one training dataset can be more easily used to pre-train or re-train the one or more machine learning models. In many embodiments, the common hierarchy, structure, schema, etc. can be predetermined.

In some embodiments, the users, systems, and/or methods further can determine whether to add the newly created historical input and/or output data to the training dataset for retraining the ML/AI models based upon user feedback, predetermined criteria, and/or confidence scores for the historical output data. The user feedback can be associated with the output data of the ML/AI models or the output of the systems and/or methods using the ML/AI models.

In various embodiments, where machine learning techniques are not explicitly described in the processes, procedures, activities, operations, actions, and/or methods, such processes, procedures, activities, operations, actions, and/or methods can be read to include machine learning techniques suitable to perform the intended activities (e.g., determining, processing, analyzing, predicting, etc.). In several embodiments, the one or more ML/AI models can be configured to start or stop automatically upon occurrence of predefined events and/or conditions. In certain embodiments, the systems and/or methods can use a pre-trained ML/AI model, without any re-training.

Additional Exemplary Embodiments

Various embodiments can include a computer-implemented method. The computer-implemented method can include receiving telematics data from one or more sensors of an electronic device of a user. The computer-implemented method also can include assessing driving behavior of the user based on the telematics data. The computer-implemented method further can include generating a personalized digital training program for the user based at least on the driving behavior of the user. The computer-implemented method additionally can include generating one or more driving scores for the user based on performance of the user on the personalized digital training program. The computer-implemented method also can include outputting a driving credential for the user based on the one or more driving scores.

A number of embodiments can include a system. The system can include one or more processors and one or more non-transitory computer-readable media storing computing instructions that, when executed on the one or more processors, cause the one or more processors to perform certain operations. The operations can include receiving telematics data from one or more sensors of an electronic device of a user. The operations also can include assessing driving behavior of the user based on the telematics data. The operations further can include generating a personalized digital training program for the user based at least on the driving behavior of the user. The operations additionally can include generating one or more driving scores for the user based on performance of the user on the personalized digital training program. The operations also can include outputting a driving credential for the user based on the one or more driving scores.

Several embodiments can include one or more non-transitory computer-readable media storing computing instructions that, when executed by one or more processors, cause the one or more processors to perform certain operations. The operations can include receiving telematics data from one or more sensors of an electronic device of a user. The operations also can include assessing driving behavior of the user based on the telematics data. The operations further can include generating a personalized digital training program for the user based at least on the driving behavior of the user. The operations additionally can include generating one or more driving scores for the user based on performance of the user on the personalized digital training program. The operations also can include outputting a driving credential for the user based on the one or more driving scores.

Various embodiments can include a system. The system can include a first means for receiving telematics data from one or more sensors of an electronic device of a user. The system also can include a second means for assessing driving behavior of the user based on the telematics. The system additionally can include a third means for generating a personalized digital training program for the user based at least on the driving behavior of the user. The system further can include a fourth means for generating one or more driving scores for the user based on performance of the user on the personalized digital training program. The system also can include a fifth means for outputting a driving credential for the user based on the one or more driving scores.

ADDITIONAL CONSIDERATIONS

Although providing telematics-based driving training and credentialing using a graphical user interface has been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting.

It is intended that the scope of the disclosure shall be limited only to the extent required by the appended claims. For example, to one of ordinary skill in the art, it will be readily apparent that any element of FIG. 1-6 can be modified, and that the foregoing discussion of certain of these embodiments does not necessarily represent a complete description of all possible embodiments. Additionally, one or more of the procedures, processes, operations, actions, and/or activities of the method in FIG. 4 can include different procedures, processes, actions, and/or activities and be performed by many different modules, in many different orders. One or more elements of the displayed content in any of FIGS. 5 and 6 can include different graphical user interfaces, interactive interfaces, activation controls, and/or visual prompts, etc., and include any suitable arrangements and/or layouts. As another example, the modules, models, elements, and/or systems within system 300 or system 310 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

As will be appreciated based upon the foregoing specification, the above-described embodiments of the disclosure can be implemented using computer programming or engineering techniques including computer software, firmware, hardware or any combination or subset thereof. Any such resulting program, having computer-readable code means, can be embodied, or provided within one or more computer-readable media, thereby making a computer program product, e.g., an article of manufacture, according to the discussed embodiments of the disclosure. The computer-readable media can be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code can be made and/or used by executing the code directly from one medium, by copying the code from one medium to another medium, or by transmitting the code over a network.

These computer programs (also known as programs, software, software applications, "apps," or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor can include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In one embodiment, a computer program is provided, and the program is embodied on a computer readable medium. In an exemplary embodiment, the system can be executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various environments without compromising any major functionality. In some embodiments, the system includes multiple components distributed among a plurality of computing devices. One or more components can be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements, actions, operations, or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112 (f) unless traditional means-plus-function language is expressly recited, such as "means for" or "step for" language being expressly recited in the claim(s).

For simplicity and clarity of illustration, the drawing figures illustrate the general manner of construction, and descriptions and details of well-known features and techniques can be omitted to avoid unnecessarily obscuring the present disclosure. Additionally, elements in the drawing figures are not necessarily drawn to scale. For example, the dimensions of some of the elements in the figures can be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but can include other elements not expressly listed or inherent to such process, method, system, article, device, or apparatus.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" may, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

This written description uses examples to disclose the disclosure, including the best mode, and to enable any person skilled in the art to practice the disclosure, including making and using any devices or computer systems and performing any incorporated computer-based or computer-implemented methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed:

1. A computer-implemented method comprising:

capturing telematics data, using one or more sensors of an electronic device of a user, wherein the one or more sensors comprise one or more of a Global Positioning System (GPS), a camera, or an accelerometer;

assessing driving behavior of the user based on the telematics data;

generating a personalized digital training program for the user based at least on the driving behavior of the user;

generating one or more driving scores and a driving credential for the user based on performance of the user on the personalized digital training program, wherein the driving credential is based on the one or more driving scores and comprises an authentic verification that the user possesses a threshold level of driving skills;

storing data of the one or more driving scores and the driving credential in a secure database having access controls operated by the user; and transmitting one or more of the one or more driving scores or the driving credential to a third party to verify that the user possesses the threshold level of driving skills, wherein:

the personalized digital training program is generated using one or more machine learning models that analyze the telematics data to identify driving skill weaknesses of the user;

the one or more machine learning models comprise one or more of decision trees, KNN, or neural networks;

the one or more machine learning models are trained using supervised, semi-supervised, or unsupervised learning; and training data for the one or more machine learning models is collected from historical input and output data and updated periodically to re-train the one or more machine learning models.

2. The computer-implemented method of claim 1 further comprising:

generating digital summaries based on the telematics data over a predetermined time period; and identifying one or more types of skills based on the digital summaries corresponding to the driving behavior of the user.

3. The computer-implemented method of claim 2, wherein assessing the driving behavior of the user further comprises:

rating each of the one or more types of skills using a respective skill level assessment to generate a skill rating for each of the one or more types of skills;

determining an overall level of skill based on the skill ratings for the one or more types of skills; and storing the overall level of skill on a driver profile of the user.

4. The computer-implemented method of claim 3 further comprising:

visualizing the skill ratings for the one or more types of skills as concentric circles displayed on a graphical user interface (GUI) of a mobile device of the user, wherein a center of the concentric circles indicates a baseline level associated with a good driving standard, wherein the baseline level comprises a range of respective skill levels that meet or exceed the good driving standard, and wherein each outer circle indicates another level associated with another driving standard.

5. The computer-implemented method of claim 3 further comprising:

updating the driver profile of the user when a new respective skill level assessment is completed.

6. The computer-implemented method of claim 1 further comprising:

initiating one or more digital training programs based on a driver profile of the user for display on a graphical user interface of the electronic device of the user.

7. The computer-implemented method of claim 6 further comprising:

displaying one or more interactive interfaces on the electronic device of the user, wherein the one or more interactive interfaces comprise one or more of a driver training mode, a drive mode, a driving credentials mode, or a rewards mode.

8. The computer-implemented method of claim 1, wherein generating the personalized digital training program for the user comprises:

identifying one or more types of digital training courses corresponding to one or more skill ratings that fall below a predetermined threshold, wherein the one or more types of digital training courses comprise at least one of: monitoring vehicle trips, interacting with driving simulations, or responding to online quizzes.

9. The computer-implemented method of claim 1, wherein generating the one or more driving scores for the user comprises:

rating training performance results for the user using the personalized digital training program; and displaying the training performance results on a graphical user interface (GUI) of a mobile device of the user.

10. The computer-implemented method of claim 1, further comprising:

prior to accessing the secure database, verifying an identity of the user using a verified digital credential.

11. A system comprising one or more processors and one or more non-transitory computer-readable media storing computing instructions that, when executed on the one or more processors, cause the one or more processors to perform operations comprising:

capturing telematics data, using one or more sensors of an electronic device of a user, wherein the one or more sensors comprise one or more of a Global Positioning System (GPS), a camera, or an accelerometer;

assessing driving behavior of the user based on the telematics data;

generating a personalized digital training program for the user based at least on the driving behavior of the user;

generating one or more driving scores and a driving credential for the user based on performance of the user on the personalized digital training program, wherein the driving credential is based on the one or more driving scores and comprises an authentic verification that the user possesses a threshold level of driving skills;

storing data of the one or more driving scores and the driving credential in a secure database having access controls operated by the user; and transmitting one or more of the one or more driving scores or the driving credential to a third party to verify that the user possesses the threshold level of driving skills, wherein:

the personalized digital training program is generated using one or more machine learning models that analyze the telematics data to identify driving skill weaknesses of the user;

the one or more machine learning models comprise one or more of decision trees, KNN, or neural networks;

the one or more machine learning models are trained using supervised, semi-supervised, or unsupervised learning; and training data for the one or more machine learning models is collected from historical input and output data and updated periodically to re-train the one or more machine learning models.

12. The system of claim 11, wherein the operations further comprise:

generating digital summaries based on the telematics data over a predetermined time period; and identifying one or more types of skills based on the digital summaries corresponding to the driving behavior of the user.

13. The system of claim 12, wherein assessing the driving behavior of the user further comprises:

rating each of the one or more types of skills using a respective skill level assessment to generate a skill rating for each of the one or more types of skills;

determining an overall level of skill based on the skill ratings for the one or more types of skills; and storing the overall level of skill on a driver profile of the user.

14. The system of claim 11, wherein the operations further comprise:

initiating one or more digital training programs based on a driver profile of the user for display on a graphical user interface of the electronic device of the user; and displaying one or more interactive interfaces on the electronic device of the user, wherein the one or more interactive interfaces comprise one or more of a driver training mode, a drive mode, a driving credentials mode, or a rewards mode.

15. The system of claim 11, wherein the operations further comprise:

prior to accessing the secure database, verifying an identity of the user using a verified digital credential.

16. One or more non-transitory computer-readable media storing computing instructions that, when executed by one or more processors, cause the one or more processors to perform operations comprising:

capturing telematics data, using one or more sensors of an electronic device of a user, wherein the one or more sensors comprise one or more of a Global Positioning System (GPS), a camera, or an accelerometer;

assessing driving behavior of the user based on the telematics data;

generating a personalized digital training program for the user based at least on the driving behavior of the user;

generating one or more driving scores and a driving credential for the user based on performance of the user on the personalized digital training program, wherein the driving credential is based on the one or more driving scores and comprises an authentic verification that the user possesses a threshold level of driving skills;

storing data of the one or more driving scores and the driving credential in a secure database having access controls operated by the user; and transmitting one or more of the one or more driving scores or the driving credential to a third party to verify that the user possesses the threshold level of driving skills, wherein:

the personalized digital training program is generated using one or more machine learning models that analyze the telematics data to identify driving skill weaknesses of the user;

the one or more machine learning models comprise one or more of decision trees, KNN, or neural networks;

the one or more machine learning models are trained using supervised, semi-supervised, or unsupervised learning; and training data for the one or more machine learning models is collected from historical input and output data and updated periodically to re-train the one or more machine learning models.

17. The one or more non-transitory computer-readable media of claim 16, wherein the operations further comprise:

generating digital summaries based on the telematics data over a predetermined time period; and identifying one or more types of skills based on the digital summaries corresponding to the driving behavior of the user.

18. The one or more non-transitory computer-readable media of claim 17, wherein assessing the driving behavior of the user further comprises:

rating each of the one or more types of skills using a respective skill level assessment to generate a skill rating for each of the one or more types of skills;

determining an overall level of skill based on the skill ratings for the one or more types of skills; and storing the overall level of skill on a driver profile of the user.

19. The one or more non-transitory computer-readable media of claim 16, wherein the operations further comprise:

initiating one or more digital training programs based on a driver profile of the user for display on a graphical user interface of the electronic device of the user; and displaying one or more interactive interfaces on the electronic device of the user, wherein the one or more interactive interfaces comprise one or more of a driver training mode, a drive mode, a driving credentials mode, or a rewards mode.

20. The one or more non-transitory computer-readable media of claim 16, wherein the operations further comprise:

prior to accessing the secure database, verifying an identity of the user using a verified digital credential.

21. A system comprising:

first means for capturing telematics data, using one or more sensors of an electronic device of a user, wherein the one or more sensors comprise one or more of a Global Positioning System (GPS), a camera, or an accelerometer;

second means for assessing driving behavior of the user based on the telematics data;

third means for generating a personalized digital training program for the user based at least on the driving behavior of the user;

fourth means for generating one or more driving scores and a driving credential for the user based on performance of the user on the personalized digital training program, wherein the driving credential is based on the one or more driving scores and comprises an authentic verification that the user possesses a threshold level of driving skills;

fifth means for storing data of the one or more driving scores and the driving credential in a secure database having access controls operated by the user; and sixth means for transmitting one or more of the one or more driving scores or the driving credential to a third party to verify that the user possesses the threshold level of driving skills, wherein:

the personalized digital training program is generated using one or more machine learning models that analyze the telematics data to identify driving skill weaknesses of the user;

the one or more machine learning models comprise one or more of decision trees, KNN, or neural networks;

the one or more machine learning models are trained using supervised, semi-supervised, or unsupervised learning; and training data for the one or more machine learning models is collected from historical input and output data and updated periodically to re-train the one or more machine learning models.

* * * * *